United States Patent [19]

Goyheneix

[11] 4,367,694
[45] Jan. 11, 1983

[54] MODULAR ELEMENT TO BUILD GROUPS OF CAGES FOR EGG-LAYING FOWLS AND THE LIKE

[76] Inventor: Esteban Jose Goyheneix, Reconquista 661, 2°, Buenos Aires, Argentina, 1003

[21] Appl. No.: 192,258

[22] Filed: Sep. 30, 1980

[30] Foreign Application Priority Data

Oct. 12, 1979 [AR] Argentina .............................. 278485

[51] Int. Cl.³ ............................................. A01K 31/06
[52] U.S. Cl. ......................................... 119/17; 119/48
[58] Field of Search ....................... 119/17, 18, 22, 48

[56] References Cited

U.S. PATENT DOCUMENTS

| | | | |
|---|---|---|---|
| 415,769 | 11/1889 | Drewitt | 119/17 |
| 2,041,049 | 5/1936 | Crawford | 119/17 |
| 2,105,058 | 1/1938 | Smith et al. | 119/48 |
| 2,612,862 | 10/1952 | Ipsen | 119/18 |
| 2,882,857 | 4/1959 | Ernst et al. | 119/18 |
| 3,381,664 | 5/1968 | Barlocci | 119/18 X |
| 4,212,269 | 7/1980 | White et al. | 119/48 X |

Primary Examiner—Paul J. Hirsch
Assistant Examiner—Robert P. Swiatek
Attorney, Agent, or Firm—Schwartz, Jeffery, Schwaab, Mack, Blumenthal & Koch

[57] ABSTRACT

The present invention refers to a modular element to build groups of cages for farm animals, such as fowls, rabbits, etc, arranged in rows of cells for the animals, forming sets, being the rest of the parts support structures and accessories to feed said animals; being each module made up of one solid monolithic piece, preferably of injected plastic, of prism like shape with horizontal axis and two opposite bases that are parallel and vertical surfaces; being the lateral sides made up of grids and being one of the bases completely open and the other one serving as a separating wall between two successive cages with roofs and floors forming surfaces, including cross reinforcements and means for fixing purposes, removable from the support structure.

9 Claims, 20 Drawing Figures

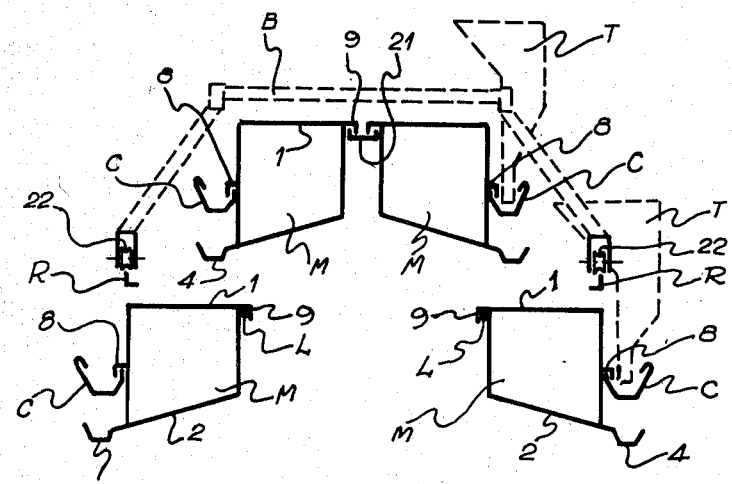
FIG. 3
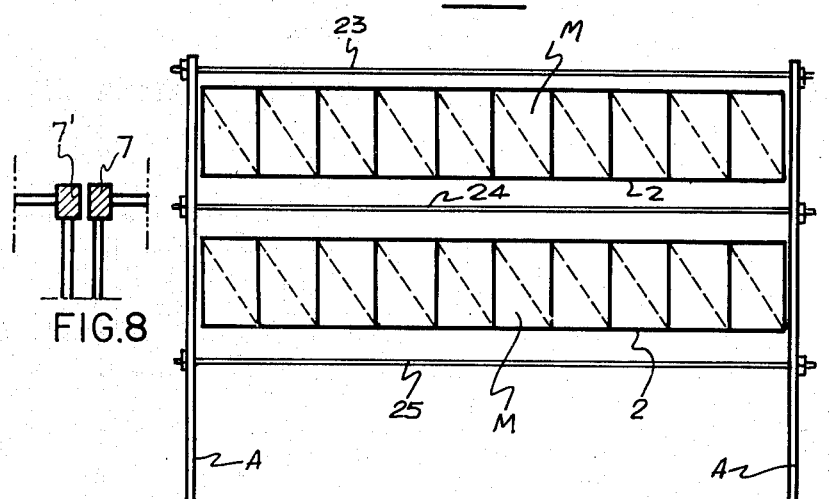
FIG. 8
FIG. 4
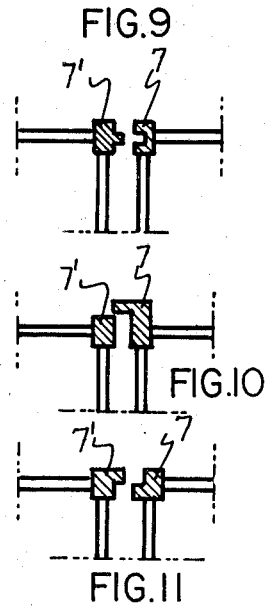
FIG. 9
FIG. 10
FIG. 11
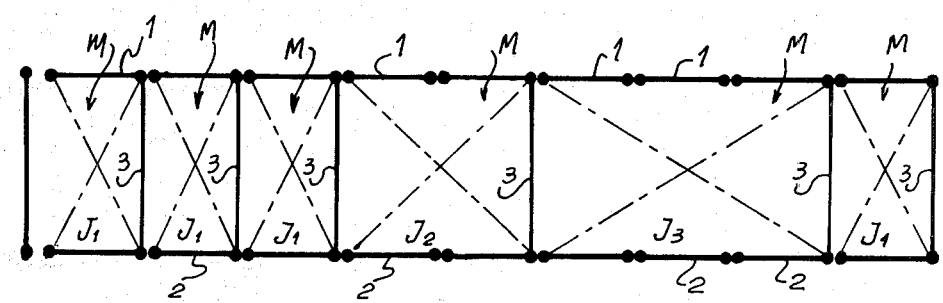
FIG. 5

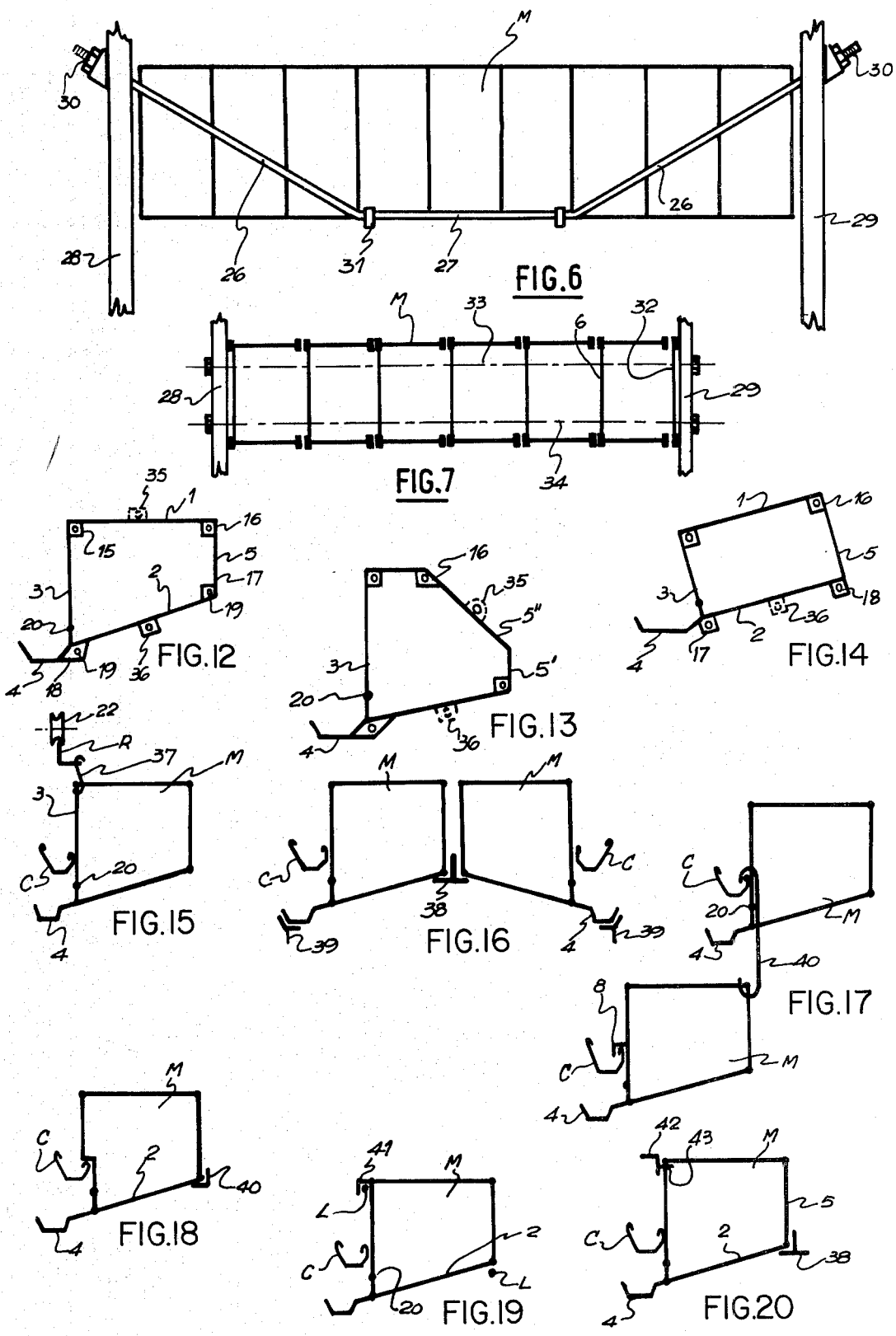

MODULAR ELEMENT TO BUILD GROUPS OF CAGES FOR EGG-LAYING FOWLS AND THE LIKE

OBJECT OF THE INVENTION

The main object of the present invention is a modular element to build groups of cages for layers, such as hens and others, as well as poultry, domestic fowls, breeders and the like, and also for other farm animals such as rabbits and others. The above modular element has been developed to profit from the advantages of plastics, particularly injectable plastics, to facilitate the setting up and maintenance of these groups, and to simplify transport and additional handling requirements. This invention covers an element of the kind specified above and suitable for the barns where a large number of animals as aforesaid are kept mainly laying hens kept in cages arranged in rows in one or several levels supported by structures that may be hanging from the roof or placed on the floor, including commodities to receive the eggs, to feed the animals and other additional activities.

Traditionally, for the aforesaid applications the cages were built with wire mesh with a capacity to keep aproximately four hens per cage, arranged, generally, in groups of up to ten cages each, with the possibility of managing them in rows, one after the other, on support structures of different kinds, particularly suitable to support several rows in several overlapping levels and that generally extend along the barn, from one end to the other.

In these conventional applications, in order to facilitate the setting up, the meshes for each group of up to ten cages or similar number per group are prepared in the factory, being it necessary to make special folds in the meshes and separately provide joining means to assemble and fix the several parts, such as floors, roofs, front and back walls, etc. to build the cells in the way required by the operation of collecting eggs, feeding, water supply, cleaning, etc. For these purposes the meshes used are about 3 meters long, by about one meter wide; this implies that special care must be taken when handling and transporting them, and specific tools are required to fold the mesh and make the necessary linkings to build each group and the cages; their size usually causes distorsions and harms the meshes disturbing the operation, mainly in this case where large number of meshes are handled during the setting up.

On the other hand, the cages having wire mesh, that have been used up to date, are always exposed to factors that affect their useful life, mainly because their constituing material, iron, is easily damaged by the acids contained in the guano of the animals. Besides, hens are restless and not very clever animals which frequently brings about the need to twist the wires to free the heads of the hens trapped in the mesh and many times the hens die in their effort to get out, all of which obviously affects the wires. It is also worth mentioning, the fact that the wire mesh cages easily rust owing to the desinfectants action, and they are kept clean by the friction of the hens feathers, which produce a similar effect to lubrication. But for some reason, whenever the cages remain empty for some days, they easily rust and they may become completely useless.

We may also add to all the inconveniences mentioned above, that it has been proved that the wire cages are not recoverable, meaning that the material they are made up with cannot be used to fix new cages. Therefore, all cages that have been damaged in any way must be replaced by new ones with the consequence of a new investment for the material required.

The new techniques developed to use plastics in the industrialization of many kinds of products, have gradually solved satisfactorily many inconveniences, among which the case stated in connection with wire mesh cages is found.

However, in this field, no plastic realizations similar to the former ones have been obtained. Some of the alternatives include injected panels but they require complicated setting up conditions and their application is limited, since they need expensive and complex structures.

In order to use plastics in a competitive and satisfactory way, profiting from the advantages of this material, to solve the aforesaid inconveniences, the modular cage covered by this invention has been achieved. This element further solves the problem of size and power of the injecting machines necessary for their manufacture. In fact, to inject plastic panels having the same size than the aforesaid metal meshes, to be able to go on with similar techniques for the setting up, very big machines with high power would be necessary and probably no such machines exist in the world. However, to manufacture modular elements as disigned in the invention many injecting machines with less requirements may be suitable for this purpose.

This means that the core of this patent of invention is found in the discovery of a way of profiting from the plastics, not because of the material itself, but because of its application in the building of modules suited to solidly adjust themselves in groups of the same or larger number of cages than the conventional wire-mesh cages. Apart from the many solutions brought about to avoid the inconveniences derived from the wire-meshes and the benefits of the use of injectable plastics, the modular design as per this invention has many other advantages: smaller size required for the carriage to the place of setting up, making transportation easier, versatility in the size of the barns where they are to be installed, speed in the setting up, saving half the time taken by the traditional cages, and the possibility of reusing the material in the building of new units.

These results are a direct consequence of the constructive and functional design of the modular element covered by this invention. It consists of a monolithic piece, obtained mainly by injection. It may have a prism-like shape with flat or curved faces, made up of grids found in at least four of such faces, since necessarily the face corresponding to one of the vertical bases must be open, and sometimes, the front face may be open too, for a door, that can be a hinged or a slinding door. The support and/or linking resources can be by assembling or by outer strips held under pressure by tensile rods that can be external or cross the modules through appropriate openings or inside reinforced devices, for example, thicker edged perpendicular to be bases, that is horizontally.

The modules can also be supported by hooks, stands, hanging devices, etc., in most cases taking advantages of the parts of the supporting structure or the accessories generally attached to them for feeding purposes.

The basic prism of each module has a horizontal axis and therefore, its two equal opposite bases are in vertical respective planes, one of such basis being open, so that when another module is placed baside it in horizontal row, the closed base of one of them acts as a separating or vertical wall in between the two respective cages. The lower faces of the modules will preferably have a slope falling frontwards, where the doors of the cages are and where the horizontal conduits lie, one of them for feeding purposes the other one designed for the reception of eggs, eventually adding a horizontal conveyor to carry the eggs towards the end of the rows.

The resources incorporated to the modular element covered by this invention serve to achieve a wide range of applications and building modalities of the rows of cages mentioned above, and to adapt them to the different kinds of farms or barns, simplifying the requirements that the support structures must meet.

BRIEF DESCRIPTION OF DRAWINGS

To summarize the advantages so briefly referred to, to which the users and the people concerned with this specific subject will be able to add many others, and to facilitate the understanding of the constructive, constituing and functional particulars of the modular element covered by this invention, following, in the pages attached hereto, is a description of some examples, briefly illustrated with no specific scale. It is expressly stated that precisely because we are dealing with examples they are not meant to limit or assign any exclusive characteristic to the object of this patent of invention, but merely to explain or illustrate the basic idea of the invention.

FIG. 3 shows a diagram in elevation, corresponding to a vertical cross section including rows of cages formed by respective groups of modules as per the invention, and marked with uneven lines there is a movable frame that feeds the conduits feeders of the fowls or other animals kept in the cages.

FIG. 4 is a diagram in lengthwise elevation of the framework of the support structure that by means of beams placed lengthwise and perpendicular to them, hold two rows of cages made up of modular elements as per this invention. At each side of the same figure there are some of the alternatives foreseen to join two consecutive modules.

FIG. 5 shows how the modular elements of this invention are arranged, one beside the other, to close the successive cages so grouped; some alternatives have been thought out taking into account several sizes and number of cages, according to the different needs of the users.

FIG. 6 is a diagram showing the back wall of a row of modules as per this invention, which modules are tight together by means of a tensile rod that at times is placed in a slanting position; such modules may also be properly fastened to the aforesaid tensile rod.

FIG. 7 shows a row of cages formed by modular elements as per this invention, held together by means of tensile rods that cross them lengthwise.

FIG. 8 shows several alternatives related to the structure of the modular elements covered by this invention, as well as the resources to support them with respect to the support structure.

In all figures to equal numbers and letters correspond the same or similar parts or devices, according to the examples chosen to explain the invented modular element.

DETAILED DESCRIPTION OF THE FIGURES

Figure 1:
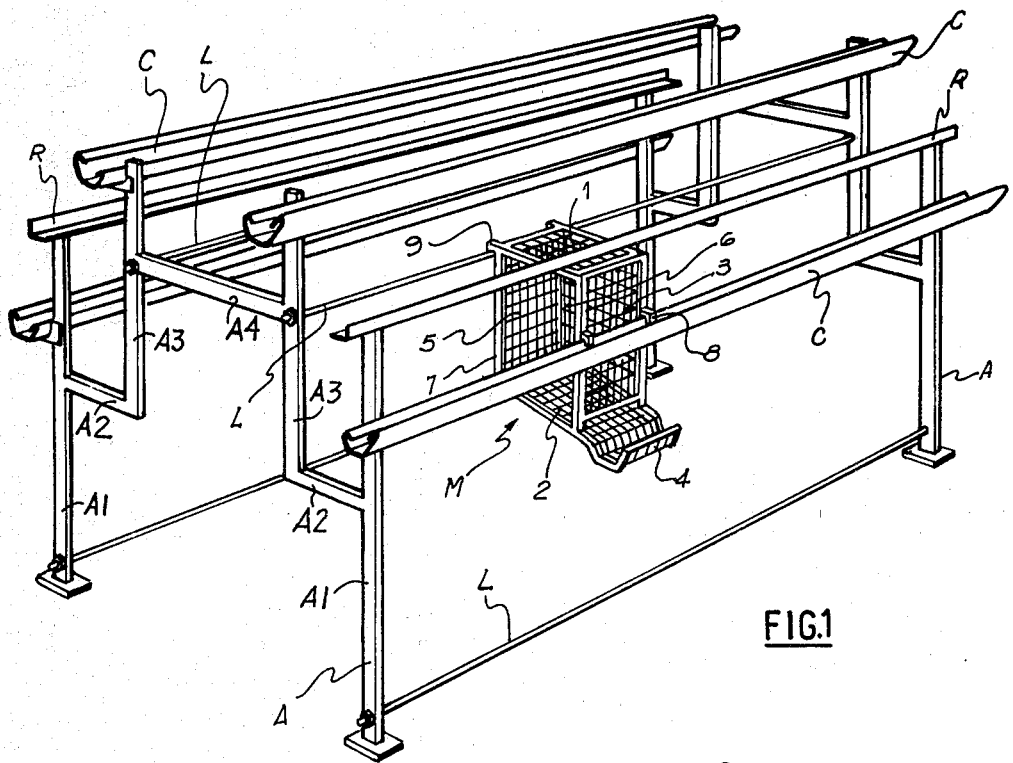
FIG. 1, is a projected view showing a modular element as per this invention, supported by a conventional structure for grouped cages, that up to the present were made with wire meshes and that according to this invention, form modular plastic sets preferably of injected plastic.

As shown in FIG. 1, the conventional structure belongs to the kind used to support wire-cages, where each row of cages includes several units having a common floor from one end to the other of the group, the same way as the back wall, the roof and the front wall, including intermediate separating walls duly fixed to the floor, roof and walls. Such structure includes vertical frameworks A and beams placed lengthwise perpendicular to them, such as girders or horizontal tensile rods "L"; it also includes as elements to join the frameworks or other functions, the conduits "C" used to feed the animals kept in the cages, and the rails "R" for stability purposes, that are also fit to guide and hold a movable frame (not illustrated) serving to supply food to the feeding conduits "C". Placed on the structure so built, there is a modular element "M" repeated several times between two consecutive frameworks "A" to make up the row. This modular element as per one of the several alternatives foreseen, consists of a prism like body having a horizontal axis and an upper face-1-formed by a grid, the floor-2-$\theta$ that is another grid sloping frontwise, the front wall-3-leaving a lower opening whereby the eggs are dropped to the receiving conduit-4-, a back vertical wall-5-and a side vertical wall-6-corresponding to the grid that closes the base of the prism, while the other base, parallel to this one, is completely open and is bordered by a perimetral frame-7-. In this alternative, the front wall-3-has two hook like front jutting devices-8- and another two at the back-9-that fit lengthwise pieces of the structure, in this case one of the conduits "C" and one of the tensile rods "L".

Figure 2:
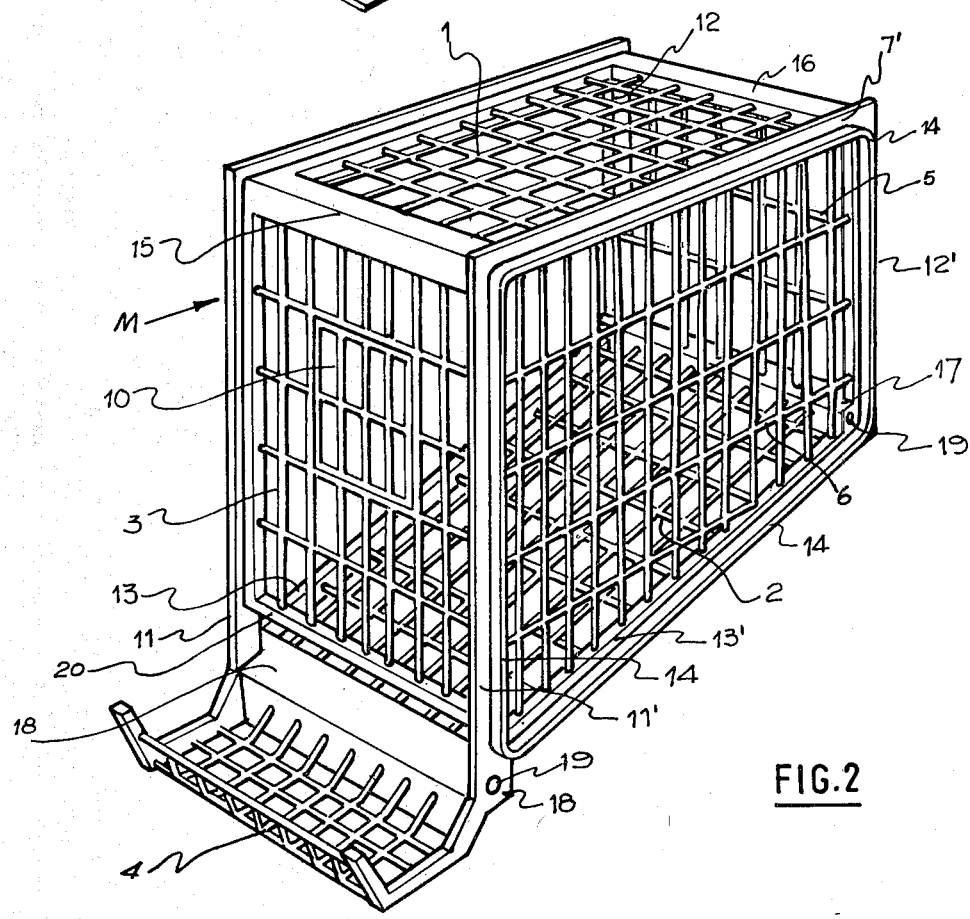
FIG. 2 is a projected view in a larger scale, of a modular element similar to the previous figure, as per one of the foreseen alternatives.

The alternative shown in FIG. 2, in a larger scale, represents a modular element as per this invention, where we can notice the roof grid-1-, the floor grid-2-the front wall-3-the side wall-6-the back wall-5-the eggs receiving conduit-4-the perimetral edge of the open side base-7-and a door-10-in the front wall-3-. In this example, both the open side base and the closed opposite base, have perimetral frames reinforced by thin bars or bars thicker than the grid rails. The horizontal edges-7-and-7'-are shown in the upper part, the front vertical ones-11-and-11'-the back ones-12-and-12'-complemented by the lower slanting ones-13-and-13'-; there are also lengthwise edges -14-that outstand to form the joint with the other perimetral frame of the opposite base.

On the other hand, there are cross braces consisting of enlargements of the edges perpendicular to the perimetral frames, said edges being referred to as 15, 16, 17 and 18; each edge has a lengthwise hole-19-supplied for the introduction of steel tensile rods screwed to the ends, or similar tension means able to keep the set of modules of one row duly compressed, with their side faces in touch with one another, as briefly designed for example in FIGS. 4, 5, 6 and 7.

In FIG. 2 we can see that the front wall grid-3-is closed at the bottom by a crosspiece-20-having an opening at the bottom whereby the eggs laid by the hens are dropped on to the collecting conduit-4-.

As an alternative, the egg-collecting conduits may be independant devices, introduced separately from the cages.

As a further alternative within this invention, the grid set at the front from the crosspiece-20-will form a separate unit that may be used as a door, hinged or removalbe on suitable links.

There is another alternative to incorporate reinforcement crosspieces parallel to the aforesaid horizontal edges placed in middle areas of the respective grids.

With the suitable distribution of the tensile rods and their proper adjustment, the incorporation of holding or other type of means for support purposes may be avoided; in this case the aforesaid perimetral joints prevent the use of hooks-shown as 8 and 9 in FIG. 1.

In FIG. 3, the modules "M" are supported by means of the hooks 8 and 9 on to the conduits "C" that receive the food for the animals and on the back lengthwise pieces-21-or the inner beams "L", as the case may be. The same figure shows in uneven lines the food supplying hoppers "T", repeated at both sides to reach the two front rows of cages; the hoppers are carried by a movable frame "D" that lies on the wheels-22-that run on the rails "R".

Another supporting means is shown in FIG. 4 where the modules "M" distributed in horizontal rows are duly positioned between two frameworks "A" and pressed by tension bars-23-24 and 25-their tension being regulated by nuts, adjusting keys, springs or other conventional resources. On the left hand of the same figure the drawing shows the design of the upper perimetral sections 7 and 7' belonging to two consecutive modular elements. The faces of these sections are in touch through two flat strips that press against each other due to the tension performed by the tensile rods. Likewise, said sections may have different types of joints, as shown in the drawings on the right hand of FIG. 4.

With the explained resources further groups of more modules may be built, always related and in horizontal rows, either by joints or under pressure using bars or tensile rods or attaching them on to the structural elements; the sets formed may have different number or size of cages, as shown in FIG. 5, where we can see that by cutting off some sides-3-simple cages "J1", double cages "J2" or triple cages "J3" etc. may be obtained. The limitation as regards their distribution will be in accordance with the needs of the farm.

FIG. 6 shows a row of modular elements "M" seen from the back face, including a tensile rod of slanting and horizontal sections-26 and 27-extended between two opposite surfaces-28 and 29-or otherwise between two seccuessive frameworks as shown in FIG. 4 as "A", including as well, adjusting means-30-controlled at the ends. The modular elements so supported at the back once pressed, form a beam resistant to bending and they also may be linked to the tensile rods by handles or clamps-31-.

The group of modules "M" as per this invention, shown in FIG. 7, is completed by a terminal plate-32-or by a wall-6-that forms the closed base of the following module. Said group is kept together by internal tensile rods-33 and 34-that may be fixed by nuts, etc, to two opposite surfaces-28 and 29-or otherwise to frames equivalent to the respective frameworks "A". The tensile rods cross the modules through the grid openings or through expressly supplied holes, and likewise they may go through outer loops attached to the modules.

In FIG. 8 the formats and support resources of the modules answer to several alternatives of the present invention, in view of the different users' requirements and the different kinds of application. Drawing I shows the module with cross edges-15-16-17 and 18-of larger section, similar to FIG. 2, and including some other cross reinforcements-35 and 36-, preferably external to avoid harming the animals; all such reinforcements are provided with lengthwise holes for the installation of tensile bars. Drawing II shows the module with a different conformation having the back wall in several sections-5' and 5''-with the possibility to include middle reinforcements-35 and 36-while the edge may or may not be reinforced as shown with 16. Drawing III shows the roof-1-parallel to the floor-2-and includes the lower edges-17 and 18-under the floor. Drawing IV shows the module of any format "M", but here the support is realized by a hanging device-37-that may be attached to the rail "R" whereon the wheel-22-runs; stability is achieved by the mere leaning on the conduit "C"; the excentricity of these hanging devices produces a tendency to bend clockwise but it may be avoided by the contact produced with the conduit. Drawing V shows the modules "M" of two rows similar to the illustration of FIG. 3, above; the modules may be supported by long "T" shaped pieces placed up side down-38-and by similar suitable pieces-39-where the receiving conduits fit-4-. Drawing VI shows the modules "M" of a lower row hanging by means of hooks-40-from the feeding conduits "C" of the upper modules, and resting at the same time, by means of hooks-8-on the lower conduits "C", as already explained. Drawing VII shows how the modules "M" lean at the front on the conduit "C" and at the back they stand on long devices-40-that stretch along the frameworks. In drawing VIII the module is supported by bars "L" so that at the front the hooks-41-cling while at the back it is the back border of the floor-2-that leans on the bar. Finally, drawing IX illustrates another alternative which consists of using long structural pieces-42-lying between frameworks with pivots-43-to hold the modules "M" on to them, while at the back of said modules the support is made by other structural pieces-38-.

Many other variations may be achieved with similar resources using the support devices of this invention, but to illustrate and explain them would make this documentation too long.

In practice, many modifications and/or improvements can be made to the modular element so described and illustrated; all such modifications and/or improvements must be considered as alternatives within the scope covered by this patent of invention, which is defined, fundamentally by the following claims.

I claim:

1. An apparatus for housing farm animals and the like, comprising:
    (a) a modular cage which can be combined with similar cages to form aligned groups of cages, said cage comprising a unitary and essentially monolithic structure of substantially rigid plastic material, and including a cage floor, roof, back wall, front wall and a first side wall, the side of said cage opposed to said first side wall being open, said cage further comprising two peripheral borders, one around said first side wall and another around said opposed open side, said peripheral borders of adjacent cages comprise interfitting projecting and depessed areas respectively, that mate with each other to form a tight junction, (b) means for supporting a plurality of said cages generally horizontally aligned in such a manner that the first side wall of a particular cage overlies the open side of an adjacently disposed cage, and (c) means for retaining said aligned row of cages on said support means.

2. Apparatus according to claim 1 wherein said floor of said cage slopes downward toward the front of the cage to permit gravity movement of eggs forwardly into a conduit integrally formed with said cage at the front thereof.

3. Apparatus according to claim 1 further including conduit means attached to a frame running lenthwise across an aligned group of cages in such a manner as to allow feeding of animals housed in said cages.

4. The apparatus of claim 1 wherein said floor, back wall, front wall and said first side wall of said cage are formed of spaced grid members so as to form a grill-type structure.

5. An apparatus for housing farm animals and the like, comprising:

(a) a modular cage which can be combined with similar cages to form aligned groups of cages, said cage comprising a unitary and essentially monolithic structure of substantially rigid plastic material, and including a cage floor, roof, back wall, front wall and a first side wall, the side of said cage opposed to said first side wall being open, said cage further comprising two peripheral borders, one around said first side wall and another around said opposed open side, constructed in such a manner so that said borders of two adjacently disposed cages contact each other so as to close said open side of said cage, (b) means for supporting a plurality of said cages generally horizontally aligned in such a manner that the first side wall of a particular cage overlies the open side of an adjacently disposed cage, said supporting means comprising a supporting frame including at least two generally vertical frame members, one at each end thereof, and a plurality of generally horizontal frame members extending between and adjustably mounted on said vertical frame members so as to provide stability to the frame, and (c) means for retaining said aligned row of cages on said support means, said retaining means comprising at least one tension bar located generally horizontally through said aligned group of cages and adjustably attached to each end thereof to said vertical frame members, and adjusting means connected to said tension bar for tightening said tension bar in order to tightly compress said group of cages.

6. Apparatus according to claim 5 wherein said supporting means further comprises rails attached to said frame running generally horizontally between said vertical frame members, said rails being positioned so as to support said cages.

7. Apparatus according to claim 5 wherein said supporting means further comprises hooks attached to said cages and removably engaging said horizontal frame members for hanging said cages on said frame.

8. Apparatus according to claim 5 wherein said cage further comprises at least one reinforcing transverse member situated lengthwise across said cage, perpendicular to said peripheral border, and wherein said transverse member has a lengthwise hole for receiving said tension bars.

9. Apparatus according to claim 8 wherein said tension bar extends through a plurality of aligned lengthwise holes of an aligned group of cages thereby supporting and stabilizing said group of cages.

* * * * *